(12) United States Patent  
Rogers (10) Patent No.: US 11,549,524 B2  
(45) Date of Patent: Jan. 10, 2023

(54) CELLULAR TUBE FOR REPLACEMENT OF TRADITIONAL GAS-CHARGED CARTRIDGES IN SUCTION STABILIZERS

(71) Applicant: Performance Pulsation Control, Inc., Richardson, TX (US)

(72) Inventor: John Thomas Rogers, Garland, TX (US)

(73) Assignee: Performance Pulsation Control, Inc., Richardson, TX (US)

( * ) Notice: Subject to any disclaimer, the term of this patent is extended or adjusted under 35 U.S.C. 154(b) by 632 days.

(21) Appl. No.: 16/526,815

(22) Filed: Jul. 30, 2019

(65) Prior Publication Data

US 2020/0032779 A1    Jan. 30, 2020

Related U.S. Application Data

(60) Provisional application No. 62/711,942, filed on Jul. 30, 2018.

(51) Int. Cl.
*F16L 55/04* (2006.01)
*F15B 1/08* (2006.01)
(Continued)

(52) U.S. Cl.
CPC .............. *F15B 1/086* (2013.01); *F15B 1/021* (2013.01); *F16L 55/04* (2013.01); *F04B 11/0016* (2013.01); *F04B 11/0091* (2013.01); *F15B 2201/3154* (2013.01); *F15B 2201/4056* (2013.01); *F15B 2201/60* (2013.01); *F15B 2201/605* (2013.01)

(58) Field of Classification Search
CPC ..... F16L 55/052; F16L 55/0336; F16L 11/26; F15B 1/08; F15B 1/04; F15B 1/086

USPC ....................... 138/26, 30; 55/361
See application file for complete search history.

(56) References Cited

U.S. PATENT DOCUMENTS

| 2,495,693 | A | * | 1/1950 | Annis | F16L 55/052 138/30 |
| 3,665,967 | A | * | 5/1972 | Kachnik | F16L 55/052 138/30 |
| 4,314,621 | A | * | 2/1982 | Hansen | F16L 55/0336 181/252 |
| 4,396,354 | A |   | 8/1983 | Thompson et al. | |

(Continued)

FOREIGN PATENT DOCUMENTS

GB    1197524 A    7/1970

OTHER PUBLICATIONS

Communication pursuant to Rules 161(2) and 162 EPC dated Jan. 21, 2021 in connection with European Patent Application No. 19845109.8, 3 pages.

(Continued)

*Primary Examiner* — Patrick F Brinson (57) ABSTRACT

An annular tube (or other shape) of elastomeric cellular material comprising elastomeric closed cells having gas infused therein is supported by structures protruding from the bottom surface of a suction stabilizer's head and/or by structures within the interior volume of the annular body of the suction stabilizer, preferably with spacing between the outer diameter of the annular tube of the cellular material and the inner walls of the suction stabilizer body. The gas-infused closed cell material may thus be employed in new suction stabilizer or pulsation dampener or to retrofit existing suction stabilizers or pulsation dampeners designed for a gas-filled bladder.

24 Claims, 8 Drawing Sheets

(51) Int. Cl.
*F15B 1/02* (2006.01)
*F04B 11/00* (2006.01)

(56) References Cited

U.S. PATENT DOCUMENTS

| | | | | |
|---|---|---|---|---|
| 4,651,781 | A * | 3/1987 | Kandelman | F15B 1/086 |
| | | | | 138/28 |
| 6,053,664 | A | 4/2000 | Crane et al. | |
| 6,948,479 | B1 * | 9/2005 | Raney | F16L 11/26 |
| | | | | 123/456 |
| 7,708,148 | B2 * | 5/2010 | Fritze | B01D 35/30 |
| | | | | 210/441 |
| 7,874,317 | B1 * | 1/2011 | Kulikov | F16L 55/041 |
| | | | | 220/721 |
| 8,701,398 | B2 * | 4/2014 | Baseley | F15B 1/04 |
| | | | | 138/30 |
| 10,030,660 | B1 | 7/2018 | Mehta et al. | |
| 2005/0276708 | A1 * | 12/2005 | Miller | F04B 53/16 |
| | | | | 417/571 |
| 2006/0185811 | A1 | 8/2006 | Schmidtke | |
| 2007/0063378 | A1 | 3/2007 | O'Donoghue | |
| 2011/0110793 | A1 | 5/2011 | Leugemors et al. | |
| 2014/0130887 | A1 * | 5/2014 | Byrne | F04B 15/02 |
| | | | | 137/15.01 |

OTHER PUBLICATIONS

Office Action dated Dec. 27, 2021 in connection with India Patent Application No. 202027053228, 6 pages.
Office Action dated Oct. 5, 2021 in connection with Algeria Patent Application No. 200654, 2 pages.
Supplementary European Search Report dated Dec. 21, 2021 in connection with European Patent Application No. 19 84 5109, 7 pages.
Notification of Transmittal of the International Search Report and the Written Opinion of the International Searching Authority, or the Declaration dated Oct. 22, 2019 in connection with International Patent Application No. PCT/US2019/44225, 9 pages.
Office Action dated Dec. 3, 2021 in connection with Eurasian Patent Application No. 202100049/31, 4 pages.
Office Action and Examination Search Report dated Mar. 4, 2022, in connection with Canadian Application No. 3,105,284, 3 pages.
Office Action dated May 11, 2022, in connection with Chilean Application No. 202003333, 17 pages.
Official Notification dated Apr. 21, 2022, in connection with Eurasian Application No. 202100049, 4 pages.
Substantive Examination Report Notice dated Mar. 16, 2022, in connection with Saudi Arabian Application No. 20514/206, 8 pages.
Office Action dated May 30, 2022 in connection with Indonesia Patent Application No. P00202010125, 3 pages.
Office Action dated Oct. 14, 2022 in connection with Chile Patent Application No. 202003333, 18 pages.
Second Office Action dated Oct. 14, 2022 in connection with Chile Patent Application No. 202003333, 28 pages.
Office Action dated Nov. 9, 2022 in connection with Colombia Patent Application No. NC2020/0015824, 15 pages.
Office Action dated Oct. 20, 2022 in connection with Canadian Patent Application No. 3,105,284, 3 pages.

* cited by examiner

CELLULAR TUBE FOR REPLACEMENT OF TRADITIONAL GAS-CHARGED CARTRIDGES IN SUCTION STABILIZERS

PRIORITY CLAIM

This application claims priority to U.S. Provisional Patent Application No. 62/711,942 filed Jul. 30, 2018 and entitled CELLULAR TUBE FOR REPLACEMENT OF TRADITIONAL GAS-CHARGED CARTRIDGES IN SUCTION STABILIZERS. The content of the above-identified patent document is incorporated by reference.

TECHNICAL FIELD

The present application relates generally to the operation of suction stabilizers in reciprocating pump systems and, more specifically, to providing a maintenance-free suction stabilizer employing closed-cell gas infused closed cell material.

BACKGROUND

Within closed fluid pumping systems, fluid pulsation or cavitation may occur in response to the sudden change of pressure associated with acceleration or deceleration of the fluid. Because fluid generally has very low compressibility, any applied force must be accounted for and variation in fluid movement can cause pulsations that, if not dampened, may become extreme and damage the pump or other portions of the piping system. Fluid pressure pulsations may result, for example, when fluid fails to maintain contact with the face of the pump's plunger as it retracts to pull fluid into the pump. When the plunger subsequently moves forward to discharge the fluid, the fluid may impact the plunger face to cause vibration or pulsation. Dramatic swings in fluid pressure during a pump cycle may have an analogous effect.

Suction stabilizers and discharge dampeners help keep the fluid in constant contact with a pump plunger and/or reduce pressure variation during the pump cycle. Typically using gas-filled bladders, especially for large pressure variations (due to the compressibility of gas), suction stabilizers and discharge dampeners act as a shock absorber to absorb the forces associated with flow variations and rapid fluid acceleration and deceleration during the pump stroke cycle. However, the gas-filled bladders require periodic maintenance to replenish the gas charge within the bladder. Failure to maintain the proper gas charge degrades the performance of the stabilizer and, in extreme cases, negates any benefit from installing the suction stabilizer or discharge dampener.

SUMMARY

An annular tube of cellular material is supported by structures protruding from the bottom surface of a suction stabilizer's head and/or by structures within the interior volume of the annular body of the suction stabilizer, preferably with spacing between the outer diameter of the annular tube of the cellular material and the inner walls of the suction stabilizer body. Gas-infused closed cell material may thus be employed in new suction stabilizer or to retrofit existing suction stabilizers designed for a gas-filled bladder.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged suction stabilizing device that can be used to control or partially control suction pulsation energy amplitudes.

Gas charged bladder suction stabilizers and pulsation dampeners enable large pressure swings to be dampened, depending on the pressure and volume of the gas within the bladder. While potentially more limited in the range of pressure spikes that can be reduced, gas-infused closed cell material—that is, compressible elastomers with closed micro-cells infused with gas—do not require gas replenishment as is typical with bladders, and as therefore often referred to as "maintenance free." However, mounting cellular material within a suction stabilizer and sizing the suction stabilizer for effective operation presents obstacles that are not easily overcome.

Figure 1:
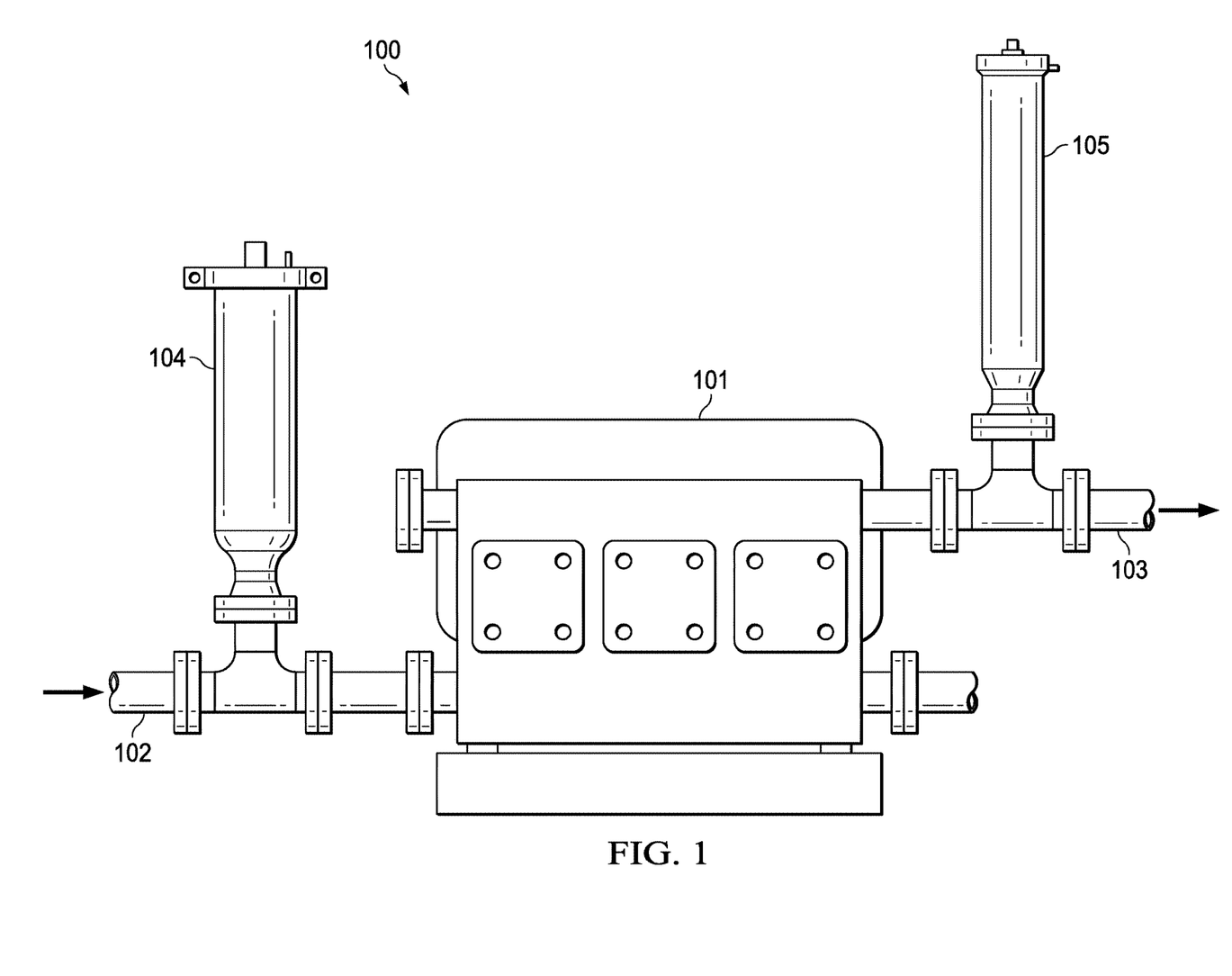
FIG. 1 illustrates a pump system with suction stabilizer within which a cellular tube may be mounted according to various embodiments of the present disclosure.

FIG. 1 illustrates a pump system with suction stabilizer within which a cellular tube may be mounted according to various embodiments of the present disclosure. The embodiment of the pump system 100 illustrated in FIG. 1 is for illustration only, and does not limit the scope of this disclosure to any particular implementation. Specifically, the use of a suction stabilizer connected to a pump inlet to illustrate the principles of the present disclosure is exemplary, as those principles may also be applied to a pulsation dampener coupled to the pump outlet.

Pump system 100 includes a reciprocating pump 101 coupled to intake piping 102 and outlet piping 103. A suction stabilizer 104 is coupled to the intake piping 102 and, in the embodiment depicted, a discharge dampener 105 is coupled to the outlet piping 103. The pump 101 receives fluid (which may be a slurry including particulate solids) by suction through the intake piping 102 during one part of the reciprocating pump stroke cycle and discharges the fluid into the outlet piping 103, to elevate the fluid, increase pressure within the pumped fluid, or the like.

Figure 2:
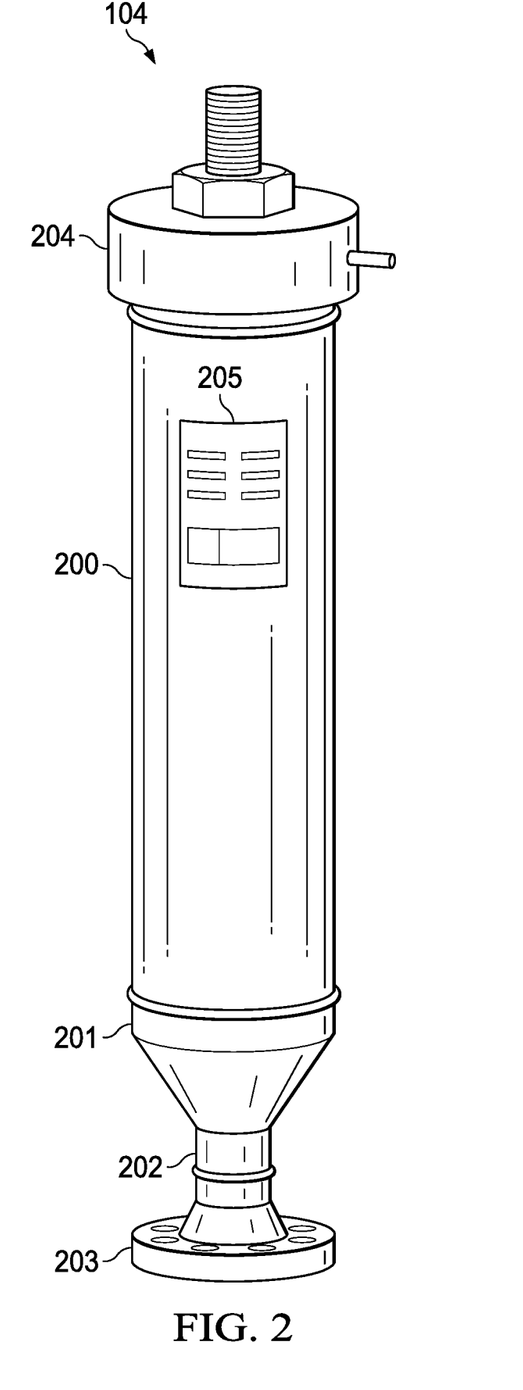
FIG. 2 is an illustration of a typical suction stabilizer structure within which a cellular tube may be mounted according to various embodiments of the present disclosure.

FIG. 2 is an illustration of a typical suction stabilizer structure within which a cellular tube may be mounted according to various embodiments of the present disclosure. The suction stabilizer 104 depicted in FIG. 2 includes an annular body 200 with a concentric reducer 201 at the bottom thereof. Via the reducer 201, a fluid passage 202 connects the internal volume of the annular body 200 to mounting flange 203 and to an opening centered therein for fluid passage into and out of the internal volume. During use, the mounting flange 203 is typically secured to a counterpart flange around an opening into the intake piping (not shown in FIG. 2) in a manner sealing the mating of the two flanges against fluid leaks. At the top of the annular body 200, a head 204 includes threads received by counterpart threads inside the top, inner surface of the annular body 200 and a disk-shaped plate, closing the upper opening of the annular body 200. As shown, a hex nut on the upper surface of the head 204 allows the head 204 to be screwed into and out of the annular body 200 to seal the upper end. The material of the annular body 200, reducer 201, fluid passage 202, mounting flanges 203, and head 204 is typically metal (e.g., steel) of sufficient thickness to withstand the anticipated fluid pressures, often with an additional material coating internal surfaces that are contacted by the pumped fluid to inhibit corrosion by the fluid from the inside. A plate 205 with manufacturer, model, rating and/or safety information may be affixed to an external surface of the annular body 200. Other types of annular bodies and head combinations may be used.

Figure 2A:
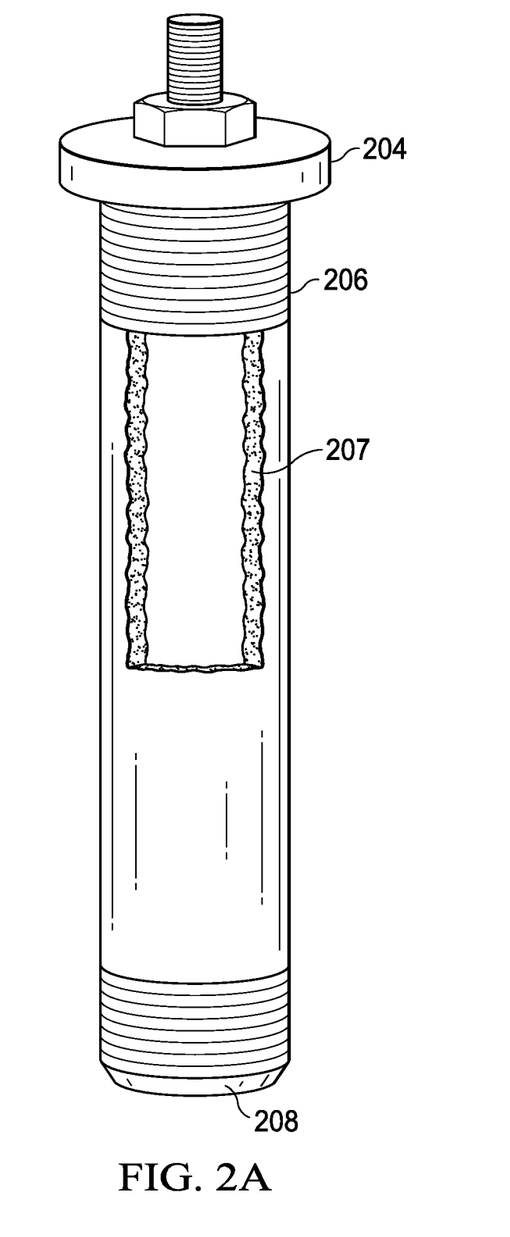
FIG. 2A is an illustration of a gas-filler bladder cartridge that may be used in the suction stabilizer structure of FIG. 2.

FIG. 2A is an illustration of a gas-filled bladder cartridge that may be used in the suction stabilizer structure of FIG. 2. In the embodiment shown in FIG. 2A, the mechanism for absorbing fluid pressure variations, the bladder cartridge 207, hangs from a central portion of the bottom surface of the head 204. In the example shown, bladder cartridge 207 is molded and bonded to head 204 and plug 208. A steel band 206 is crimped onto the surface of the bladder cartridge 207 exerting pressure inward on the surface of the bladder cartridge 207 and further onto the bond between the bladder cartridge 207 and head 204 and plug 208. Fluid pressure variation in this embodiment is absorbed by movement of the plug 208 and compression of the bladder cartridge 207.

Figure 3:
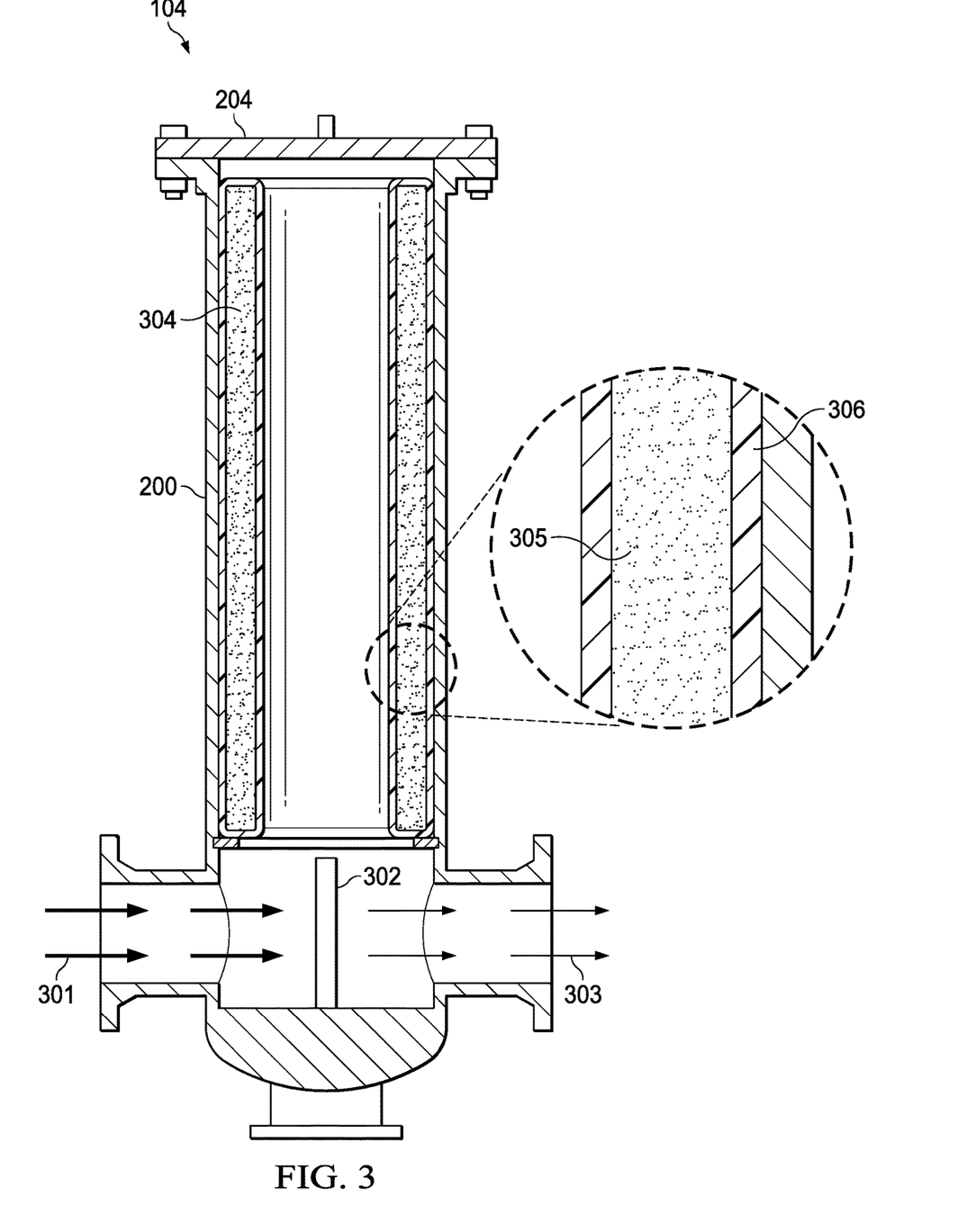
FIG. 3 is a diagrammatic view of fluid flow through a suction stabilizer within which a cellular tube is mounted according to one of the various embodiments of the present disclosure.

FIG. 3 is a diagrammatic view of fluid flow through a suction stabilizer within which a cellular tube is mounted. For simplicity and clarity, the reducer, fluid passage and mounting flange have been eliminated and fluid flow from the intake piping to the outlet piping is represented as occurring across the open bottom of the internal volume of the annular body 200. Inflowing fluid 301 with high magnitude pump pulsations has its flow interrupted by an effective baffle 302 aligned with the opening into the internal volume of the annular body 200, such that at least part of the fluid flows into that internal volume. Outflowing fluid 303 from the internal volume has reduced or low magnitude pulsations. An annular cellular material 304 is mounted within the internal volume and includes gas-filled closed cells 305 optionally enclosed within a cover or skin 306. Fluid pressure variation in this embodiment is absorbed by compression of the gas-filled closed cells 305.

One challenge with use of gas-infused closed cell material in a suction stabilizer is mounting the cellular material within the annular body in an operational manner providing the desired reduction the magnitude of fluid pulsations. An optimal mounting system would accommodate both retrofit of installed gas-filled bladder suction stabilizers and manufacture of new suction stabilizers with a cellular part. Of different installation and retention approaches possible, merely dropping a cellular tube into the internal volume of the annular housing result in a possible problem if the cellular tube ends up creating a seal between the outer diameter of the cellular tube and the inner diameter of the annular housing wherever the tube comes to rest. This could be of particular concern in "well service" pumping where sand may build up in the space between the cellular tube and the inside of the annular housing. In other types of existing unit with full diameter openings (e.g., 8" pipe shell with 8" flange), the tube or other shaped cellular element could drop all the way through the unit such that it may block the primary flow in the connecting pipe. Because of that potential problem, hanging the cellular tube from the head of the suction stabilizer, with space between the cellular tube and the inner walls of the annular housing, is preferable.

FIGS. 4 through 11 each depict alternatives for mounting a cellular tube within a suction stabilizer according to one of the various embodiments of the present disclosure. The embodiments of FIGS. 4 through 11 are for illustration only, and do not limit the scope of this disclosure to any particular implementation. For the retrofit situation, hanging the cellular tube from the head of the suction stabilizer probably requires a new head, since the original head normally has a gas-filled bladder cartridge affixed to it. In each of the embodiments of FIGS. 4 through 11, the head is sized to match the size of the head being replaced on the suction stabilizer being retrofitted, and thread lead, pitch, start, handedness, angle and diameter are likewise selected based on that of the head being replaced. The size and location of any seals should also be matched, and either or both of the head materials and the size of the hex nut may optionally be selected for consistency.

In each of the examples of FIGS. 4 through 13, a simple annular tube of cellular material with flat surfaces is depicted, although other shapes (e.g., solid cylinder) and surface contours (e.g., tri-lobe) may also be employed. In each of the embodiments of FIGS. 4 through 11, the size and shape of the cellular material is selected so that the amount of cellular material is sufficient to absorb anticipated pressure variations for the particular application contemplated. Preferably, an annular tube is employed, sized to leave space between the outer surface of the tube and the inner surface of the suction stabilizer's annular housing. If necessitated by size constraints on the suction stabilizer housing, however, the cellular material may be large enough to abut the inner housing surface. In each of the embodiments of FIGS. 4 through 11, particular structures (such as an annular support for the cellular tube on the head) may be formed in the same general manner as described for similar structures in any of the other embodiments.

Figure 4:
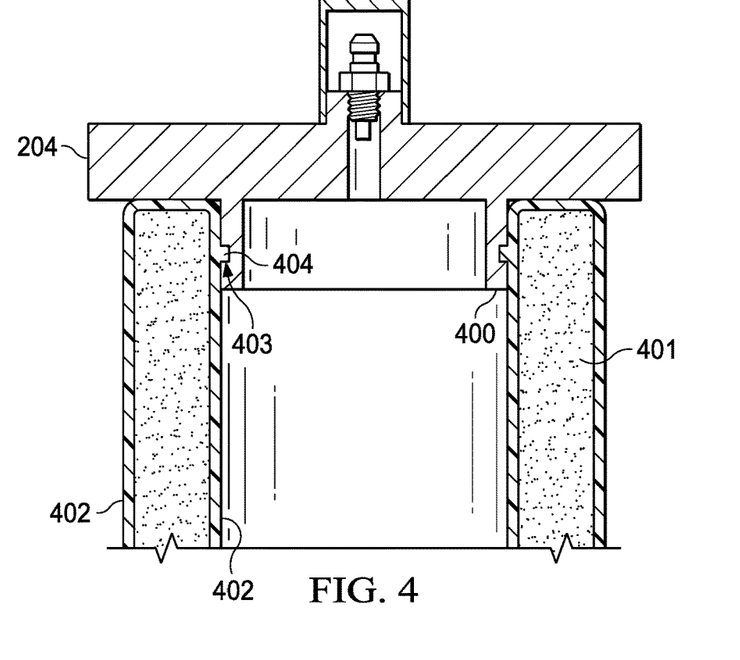
FIGS. 4 through 13 each depict alternatives for mounting a cellular tube within a suction stabilizer according to one of the various embodiments of the present disclosure.
Figure 5:
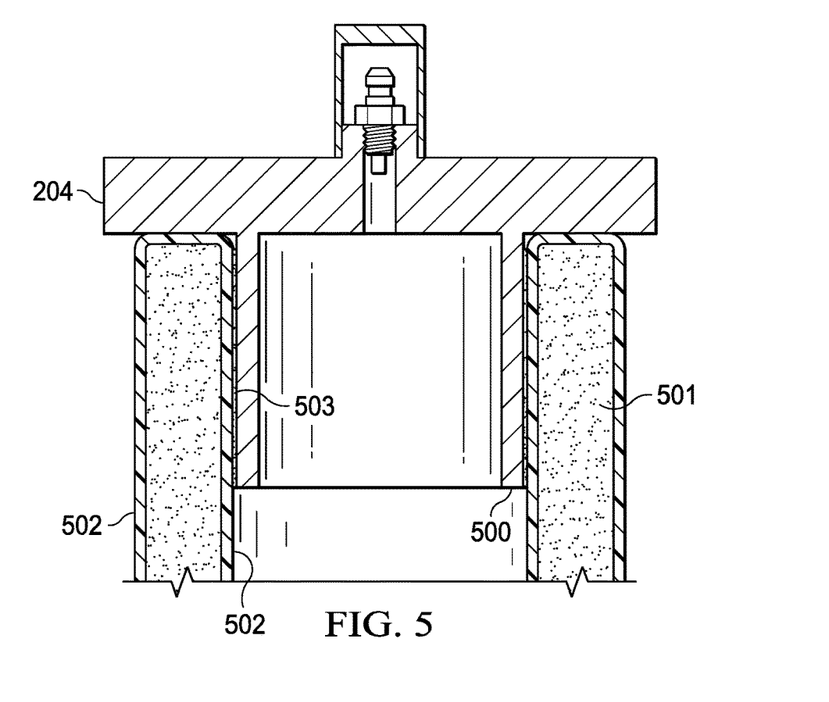

In the embodiment of FIG. 4, a support 400 is provided on the bottom side of the plate for the suction stabilizer head 204, either (for example) by being integrally formed as part of the suction stabilizer head or by being welded onto the surface of the suction stabilizer head. In the example shown, the support 400 is an annular structure protruding from the head 204 and having an outer diameter sized to match the inner diameter of the annular tube of cellular material, which includes the gas-infused cells 401 and a cover 402, as described above. The support 400 includes a notch 403 (e.g., a circumferential groove) on the outer surface thereof that is sized and positioned to mate with a protrusion 404 on the inner surface of the cover 402. The annular tube of cellular material is thus mounted by a snap-fit of the protrusion on the cover 402 with the notch 403. In a variant depicted in FIG. 5, an outer surface of the annular support 500 is simply directly bonded (e.g., by a suitable adhesive 503) to a portion of the cover 502 on the gas-infused cells 501.

Figure 6:
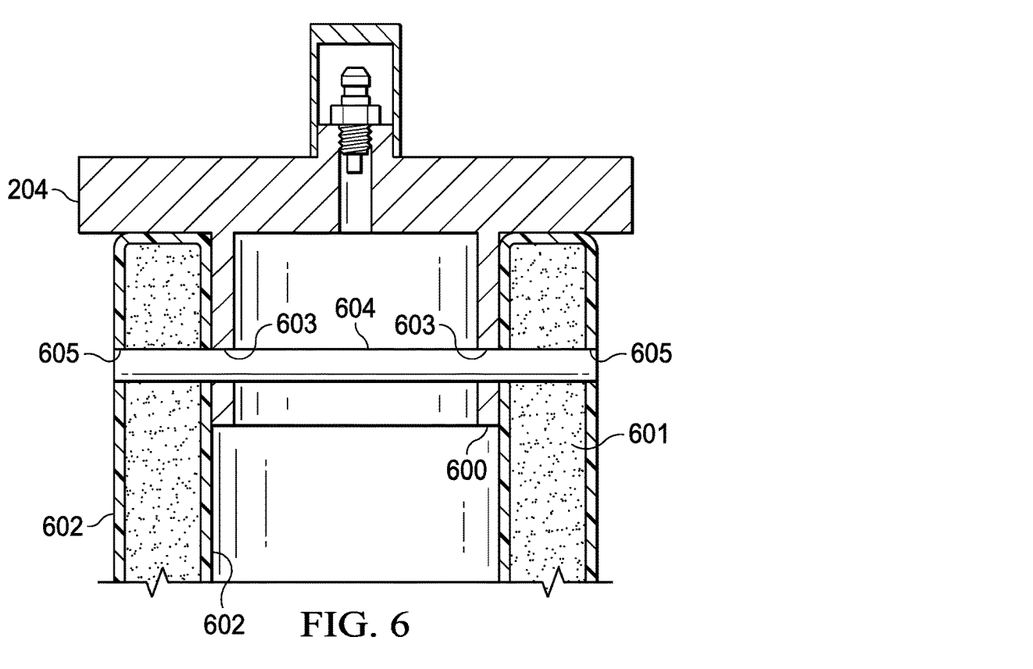
Figure 7:
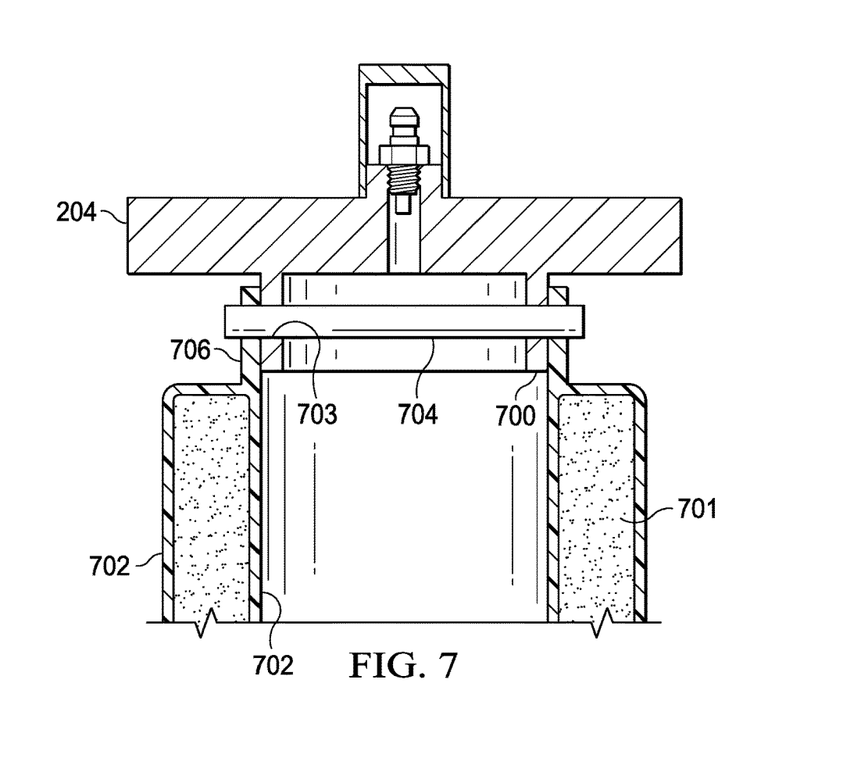
Figure 8:
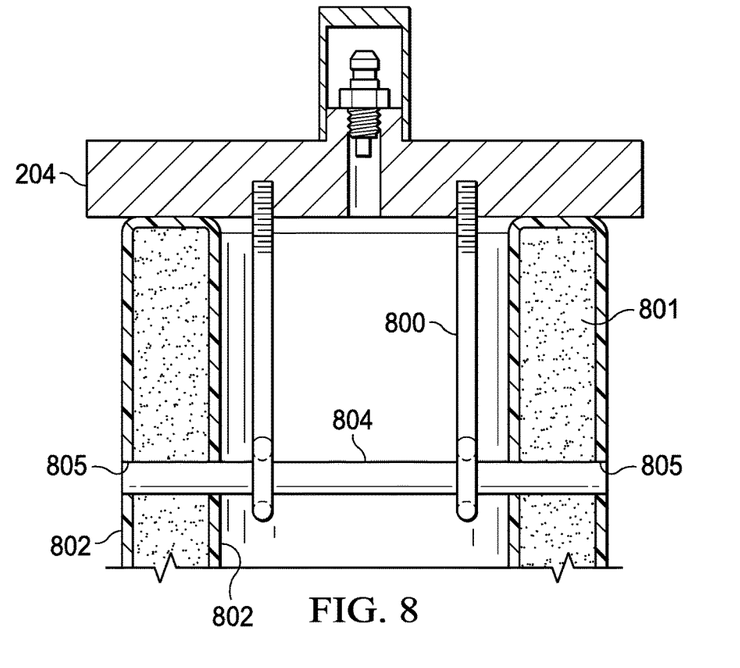

In the embodiment of FIG. 6, the annular support 600 includes aligned holes 603 for receiving a pin 604 that also extends through corresponding holes 605 through the gas-infused cells 601 and cover 602. In a variant depicted in FIG. 7, the annular support 700 includes aligned holes 703 there through for receiving a pin 704 that also extends through corresponding holes in a cap 706 molded onto an end of the annular tube formed by the gas-infused cells 701 and cover 702. In another variant depicted in FIG. 8, the support(s) 800 may be added to a head 204, such as by forming threaded holes in the bottom surface of the head 204 and screwing in threaded eyebolts as shown. A pin 804 is received through hole(s) in the support(s) 800, and also extends through corresponding holes 805 through the gas-infused cells 801 and cover 802.

Figure 9:
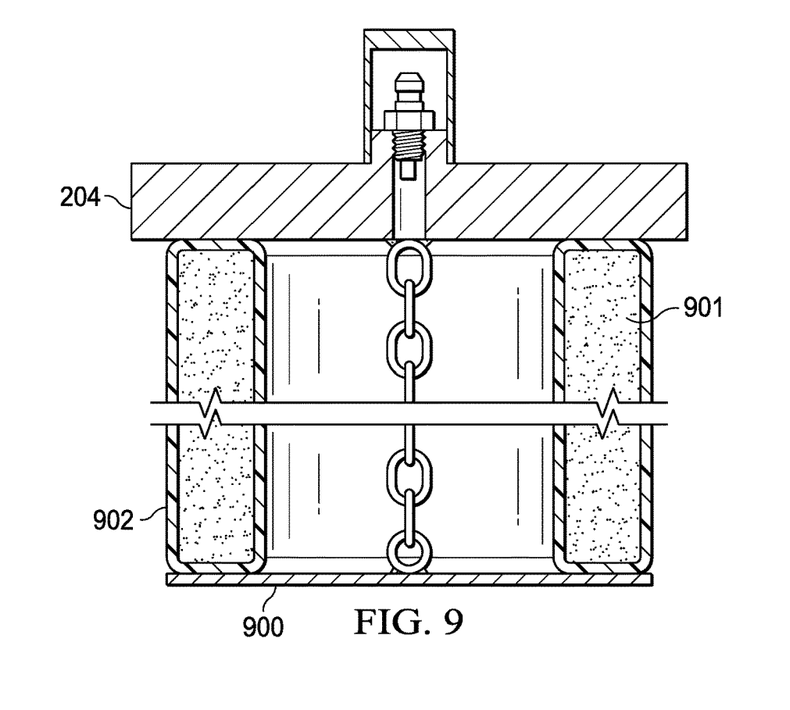

In the embodiment of FIG. 9, the annular tube formed by the gas-infused cells 901 and cover 902 is supported from the bottom by a perforated plate 900 suspended within the suction stabilizer housing from the head 204 by a chain or cable. The perforated plate 900 suspended by a chain or cable may also be used within any of the embodiments of FIGS. 4 through 8, in conjunction with the mounting mechanism described for the respective embodiment. In addition, a perforated plate of the type depicted in FIG. 9, optionally with upwardly protruding guides for receiving the bottom end of the annular tube formed by the gas-infused cells and cover, may be mounted (e.g., by welding) as a shelf within the suction stabilizer housing. Such a shelf may be used either alone or in combination with any of the embodiments of FIGS. 4 through 8, in conjunction with the mounting mechanism described for the respective embodiment.

Figure 10:
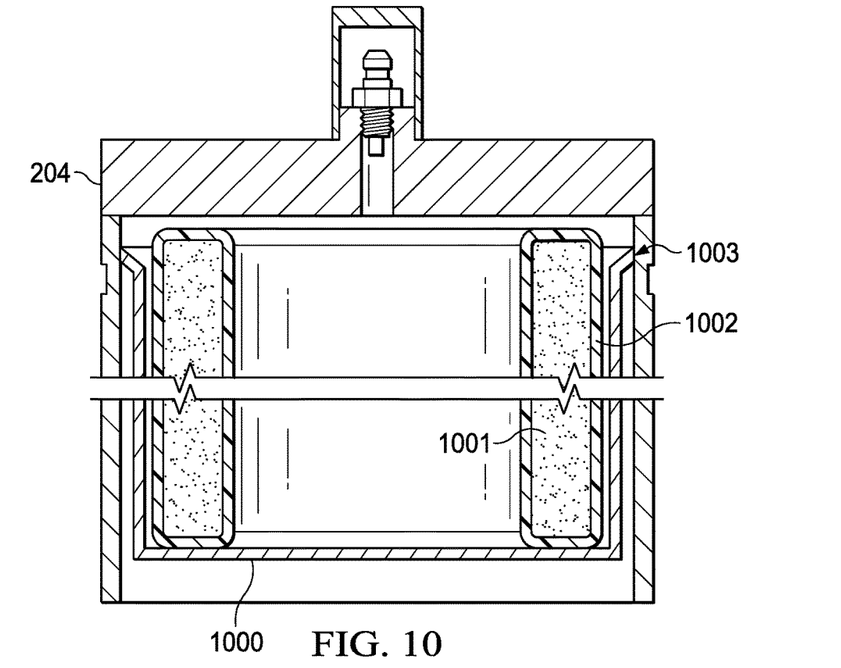
Figure 11:
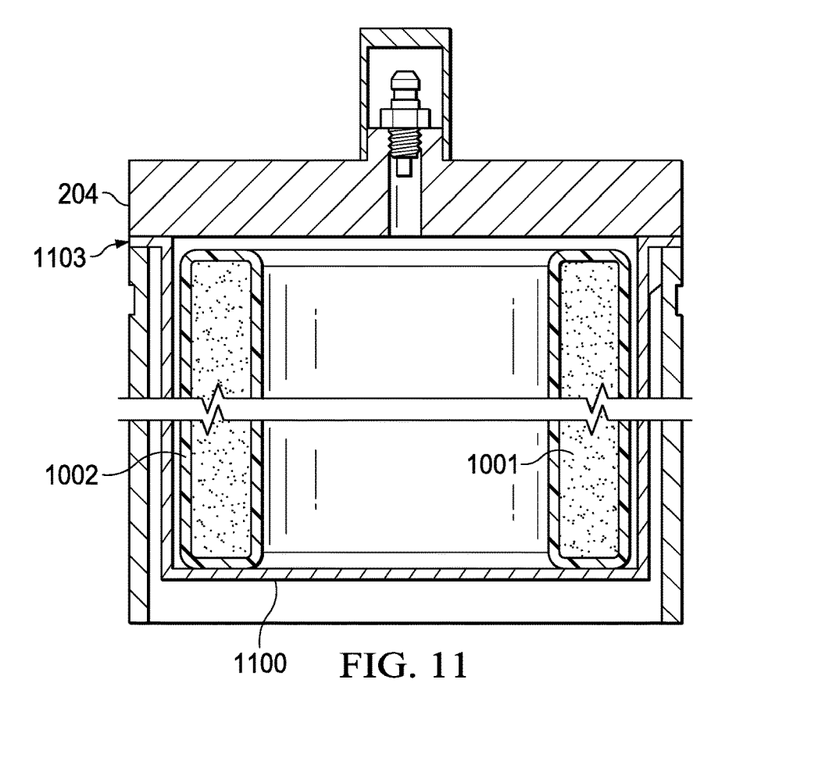

In the embodiments of FIGS. 10 and 11, the annular tube formed by the gas-infused cells 1001 and cover 1002 is supported from the bottom and outer sides by a perforated (e.g., mesh or slotted) cage 1000 size to fit within the interior volume of the annular body for the suction stabilizer and to receive the annular tube of cellular material. In the example depicted in FIG. 10, the cage 1000 is secured within and to the annular body for the suction stabilizer, such as by welding a portion 1003 of the cage 1000 to an inner surface of the suction stabilizer's annular body. In the example depicted in FIG. 11, the cage 1100 is removable, such as by having a flange 1103 that is clamped between the head 204 and the suction stabilizer's annular body when the head 204 is secured to the upper opening of the annular body. Either of the cages depicted in FIGS. 10 and 11 may be used either alone or in combination with any of the embodiments of FIGS. 4 through 8, in conjunction with the mounting mechanism described for the respective embodiment.

Figure 12:
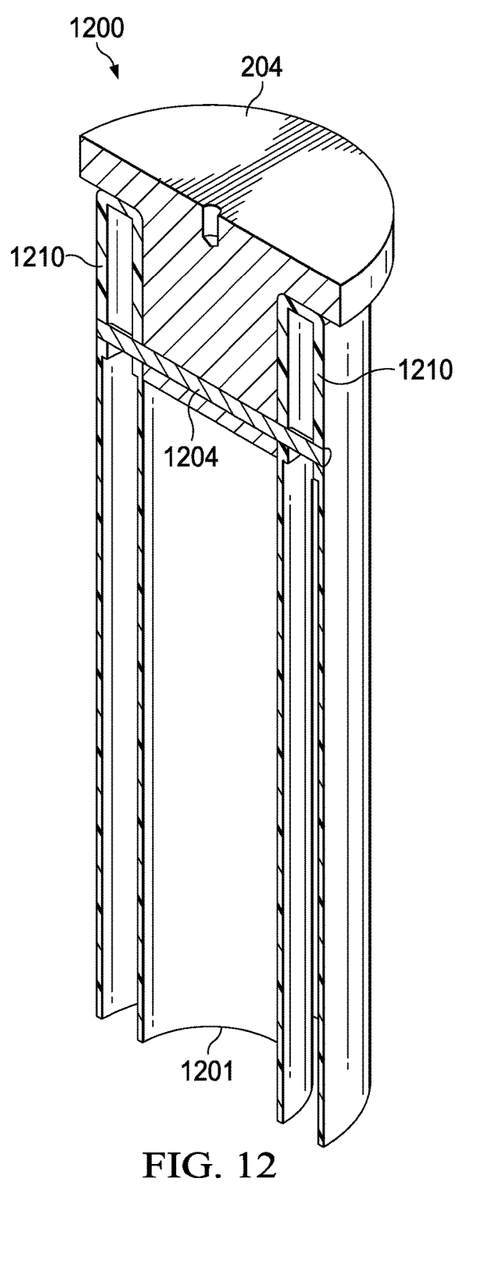
Figure 13:
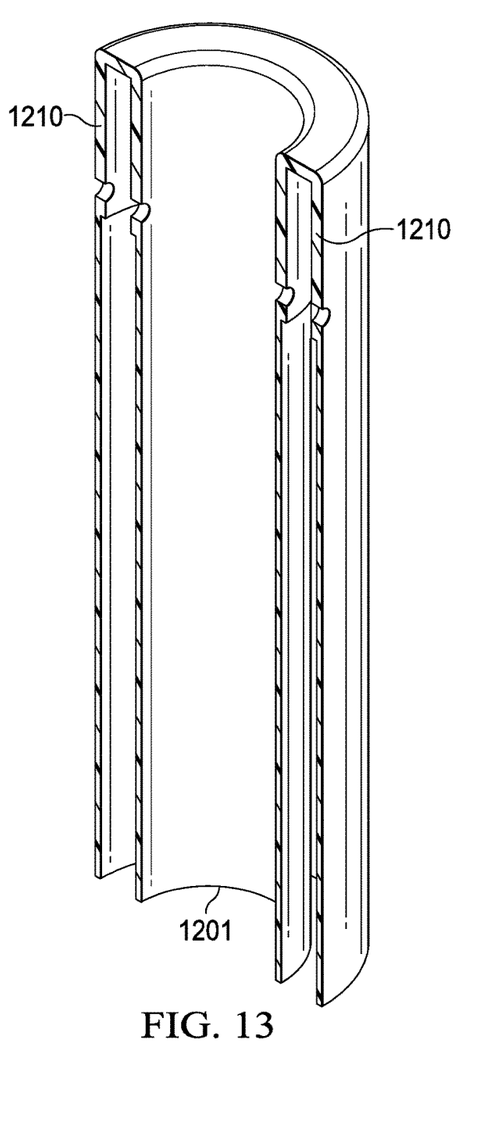

FIGS. 12 and 13 are cutaway views illustrating an alternative embodiment reinforcing the cellular tube section through which the pin is installed. As illustrated by FIG. 12, the cellular part 1200 includes an annular tube 1201 formed by the gas-infused cells and an optional cover, secured to the cap (head 204 with an annular structure protruding therefrom) using a pin 1204 as described above. The cellular part 1200 also includes reinforcement 1201 to the section of the cellular tube through the pin is installed. Reinforcement 1201 may be any of a variety of methods or materials such as (but not limited to) an additional rubber thickness added to that region, a rubber fabric composite added in that region, metal on the either or both of the inside and outside surfaces of the annular tube, metal embedded within the cellular rubber, or internal, external or embedded plastic materials used in similar fashion as the metal. FIG. 13 illustrates the annular tube 1200 of cellular material without the cap and pin, for clarity of illustrating reinforcement 1210.

The benefits of employing gas-infused closed cell material within a suction stabilizer in the manner described herein include elimination of gas charging maintenance in the suction stabilizer, increased performance consistency of the suction stabilizer over time, operation of the suction stabilizer over a larger operating pressure range than could be achieve with alternative implementations of gas-filled bladders or gas-infused closed cell material, easier removal for change at some future time, and less weight.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A cellular part for a pulsation control device, the cellular part comprising:
 a head configured to attach to and seal an opening at an upper end of a body for one of a suction stabilizer or a pulsation dampener; and
 an annular tube comprising cellular material for mounting within an internal volume of the body, the annular tube secured to a bottom of the head at a first open end of the annular tube and configured to hang within the internal volume of the body with a second open end of the annular tube spaced apart from a bottom surface of the body.

2. The cellular part of claim 1, wherein the annular tube comprises gas-infused cells contained in an elastomer.

3. The cellular part of claim 2, wherein the elastomer is surrounded by a cover.

4. The cellular part of claim 1, wherein the annular tube is secured to the bottom of the head by:
 an annular support extending from a bottom of the head and having an outer diameter sized to match an inner diameter of the annular tube,
 wherein a protrusion on an inner surface of the annular tube is sized and positioned to match with a notch on an outer surface of the annular support.

5. The cellular part of claim 1, wherein the annular tube is secured to the bottom of the head by:
 an annular support extending from a bottom of the head and having an outer diameter sized to match an inner diameter of the annular tube; and
 an adhesive bonding an inner surface of the annular tube with an outer surface of the annular support.

6. The cellular part of claim 1, wherein the annular tube is secured to the bottom of the head by:
 an annular support extending from a bottom of the head and including support holes, wherein the support holes are aligned with corresponding holes in the annular tube; and a pin that extends through the support holes of the annular support and the corresponding holes of the annular tube.

7. The cellular part of claim 6, further comprising:
reinforcement of the annular tube in a region of the corresponding holes of the annular tube.

8. The cellular part of claim 1, wherein the annular tube is secured to the bottom of the head by:
an annular support extending from a bottom of the head and including support holes;
a tube cap molded onto an end of the annular tube and including corresponding holes aligned with the support holes; and
a pin that extends through the support holes of the annular support and the corresponding holes of the tube cap.

9. The cellular part of claim 1, wherein the annular tube is secured to the bottom of the head by:
an annular support inserted into a bottom of the head and including support holes, wherein the support holes are aligned with corresponding holes in the annular tube; and
a pin that extends through the support holes of the annular support and the corresponding holes of the annular tube.

10. The cellular part of claim 1, wherein the annular tube is secured to the bottom of the head by:
a perforated plate extending past an inner diameter of the annular tube and located underneath the annular tube; and
a cable connecting the perforated plate to the head.

11. The cellular part of claim 1, wherein the annular tube is secured to the bottom of the head by:
a perforated cage secured within the body,
wherein an outer diameter of the annular tube is less than an inner diameter of the perforated cage, and
wherein a depth of the perforate cage is based on a length of the annular tube when the head is attached to the body.

12. The cellular part of claim 1, wherein the annular tube is secured to the bottom of the head by:
a perforated cage within the body and including a flange extending out from a circumference of the perforated cage, the flange clamped between the head and the body,
wherein an outer diameter of the annular tube is less than an inner diameter of the perforated cage, and
wherein a depth of the perforate cage is based on a length of the annular tube when the head is attached to the body.

13. A method of fitting or retrofitting a pulsation control device, the method comprising:
attaching a head configured to seal an opening at an upper end of a body for one of a suction stabilizer or a pulsation dampener to the upper end of the body; and
mounting an annular tube comprising cellular material within an internal volume of the body by securing the annular tube to a bottom of the head at a first open end of the annular tube to hang within the internal volume of the body, with a second open end of the annular tube spaced apart from a bottom surface of the body.

14. The method of claim 13, wherein the annular tube comprises gas-infused cells contained in an elastomer.

15. The method of claim 14, wherein the elastomer is surrounded by a cover.

16. The method of claim 13, wherein the annular tube is secured to the bottom of the head by:

providing an annular support extending from a bottom of the head and having an outer diameter sized to match an inner diameter of the annular tube,
wherein a protrusion on an inner surface of the annular tube is sized and positioned to match with a notch on an outer surface of the annular support.

17. The method of claim 13, wherein the annular tube is secured to the bottom of the head by:
providing an annular support extending from a bottom of the head and having an outer diameter sized to match an inner diameter of the annular tube; and
bonding an inner surface of the annular tube with an outer surface of the annular support.

18. The method of claim 13, wherein the annular tube is secured to the bottom of the head by:
providing an annular support extending from a bottom of the head and including support holes, wherein the support holes are aligned with corresponding holes in the annular tube; and
inserting a pin extending through the support holes of the annular support and the corresponding holes of the annular tube.

19. The method of claim 18, further comprising:
reinforcing the annular tube in a region of the corresponding holes of the annular tube.

20. The method of claim 13, wherein the annular tube is secured to the bottom of the head by:
providing an annular support extending from a bottom of the head and including support holes;
molding a tube cap onto an end of the annular tube, the tube cap including corresponding holes aligned with the support holes; and
inserting a pin extending through the support holes of the annular support and the corresponding holes of the tube cap.

21. The method of claim 13, wherein the annular tube is secured to the bottom of the head by:
providing an annular support inserted into a bottom of the head and including support holes, wherein the support holes are aligned with corresponding holes in the annular tube; and
inserting a pin extending through the support holes of the annular support and the corresponding holes of the annular tube.

22. The method of claim 13, wherein the annular tube is secured to the bottom of the head by:
providing a perforated plate extending past an inner diameter of the annular tube and located underneath the annular tube; and
providing a cable connecting the perforated plate to the head.

23. The method of claim 13, wherein the annular tube is secured to the bottom of the head by:
securing a perforated cage within the body,
wherein an outer diameter of the annular tube is less than an inner diameter of the perforated cage, and
wherein a depth of the perforate cage is based on a length of the annular tube when the head is attached to the body.

24. The method of claim 13, wherein the annular tube is secured to the bottom of the head by:
providing a perforated cage within the body, the perforated cage including a flange extending out from a circumference of the perforated cage, the flange clamped between the head and the body,
wherein an outer diameter of the annular tube is less than an inner diameter of the perforated cage, and wherein a depth of the perforate cage is based on a length of the annular tube when the head is attached to the body.

* * * * *